US012640292B2

(12) United States Patent
Yamaguchi et al.

(10) Patent No.: US 12,640,292 B2
(45) Date of Patent: May 26, 2026

(54) METHOD FOR MANUFACTURING GRAIN-ORIENTED ELECTRICAL STEEL SHEET

(71) Applicant: JFE STEEL CORPORATION, Tokyo (JP)

(72) Inventors: Hiroi Yamaguchi, Tokyo (JP); Takeshi Imamura, Tokyo (JP); Takeshi Omura, Tokyo (JP); Yoshihisa Ichihara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 507 days.

(21) Appl. No.: 18/040,813

(22) PCT Filed: Aug. 26, 2021

(86) PCT No.: PCT/JP2021/031412

§ 371 (c)(1),
(2) Date: Feb. 7, 2023

(87) PCT Pub. No.: WO2022/045264

PCT Pub. Date: Mar. 3, 2022

(65) Prior Publication Data

US 2023/0307160 A1 Sep. 28, 2023

(30) Foreign Application Priority Data

Aug. 27, 2020 (JP) ................................ 2020-143936

(51) Int. Cl.

*H01F 1/147* (2006.01)
*C21D 1/04* (2006.01)
*C21D 8/1244* (2026.01)
*C21D 8/1294* (2026.01)

(52) U.S. Cl.

CPC ............... *H01F 1/147* (2013.01); *C21D 1/04* (2013.01); *C21D 8/1244* (2013.01); *C21D 8/1294* (2013.01); *C21D 2201/05* (2013.01); *C21D 2221/00* (2013.01); *C22C 2202/02* (2013.01)

(58) Field of Classification Search

CPC ......... H01F 1/147; C21D 1/04; C21D 8/1244; C21D 8/1294; C21D 2201/05; C21D 2221/00; C22C 2202/02

See application file for complete search history.

(56) References Cited

U.S. PATENT DOCUMENTS 4,293,350 A 10/1981 Ichiyama et al.
4,770,720 A 9/1988 Kobayashi et al.
2013/0129985 A1 5/2013 Inoue et al.
2013/0167982 A1 7/2013 Yamaguchi et al.
2015/0318091 A1* 11/2015 Hirano .................... C22C 38/02 148/112
2017/0240987 A1* 8/2017 Nagoshi ............... C21D 8/1272
2018/0037965 A1* 2/2018 Takajo ................. C21D 8/1294
2019/0321920 A1 10/2019 Kwon et al.

FOREIGN PATENT DOCUMENTS

| | | | |
|---|---|---|---|
| CN | 103080351 | A | 5/2013 |
| JP | S572252 | B2 | 1/1982 |
| JP | S61117218 | A | 6/1986 |
| JP | H0369968 | B2 | 11/1991 |
| JP | H0949024 | A | 2/1997 |
| JP | 2012031516 | A | 2/2012 |
| JP | 2012177164 | A | 9/2012 |
| JP | 2020509215 | A | 3/2020 |
| KR | 1020130128731 | A | 11/2013 |
| KR | 1020150065860 | A | 6/2015 |
| WO | 2014073599 | A1 | 5/2014 |

OTHER PUBLICATIONS

Wavelength of Electron. JEOL Ltd. https://www.jeol.com/words/emterms/20121023.071258.php#gsc.tab=0 (Year: 2012).*

Henze, I and P Woizeschke. Influence of the beam oscillation pattern and oscillation frequency on the temperature field in laser brazing with keyhole formation. The International Journal of Advanced Manufacturing Technology 111:807-816. https://doi.org/10.1007/s00170-020-06111-1 (Year: 2020).*

Nov. 16, 2021, International Search Report issued in the International Patent Application No. PCT/JP2021/031412.

Nov. 22, 2022, Notification of Reasons for Refusal issued by the Japan Patent Office in the corresponding Japanese Patent Application No. 2021-571497 with English language Concise Statement of Relevance.

Sep. 6, 2024, Office Action issued by the Korean Intellectual Property Office in the corresponding Korean Patent Application No. 10-2023-7005103 with English language concise statement of relevance.

Mar. 29, 2024, Office Action issued by the China National Intellectual Property Administration in the corresponding Chinese Patent Application No. 202180051593.2 with English language search report.

(Continued)

*Primary Examiner* — Tima M. McGuthry-Banks

(74) *Attorney, Agent, or Firm* — KENJA IP LAW PC

(57) ABSTRACT

Provided is a method for manufacturing a grain-oriented electrical steel sheet to reduce iron loss by controlling the magnetic domain structure, in which the iron loss reduction effect can be maintained even when stress relief annealing is applied, and the magnetic flux density does not decrease after the magnetic domain control treatment. In the manufacturing method, on a surface of the grain oriented electrical steel sheet, a laser beam with a ring-shaped intensity distribution in which the intensity in a periphery is lower than that in a center is irradiated in a linear manner in a direction intersecting a rolling direction of the steel sheet.

12 Claims, No Drawings

(56) References Cited

OTHER PUBLICATIONS

Jan. 18, 2024, the Extended European Search Report issued by the European Patent Office in the corresponding European Patent Application No. 21861686.0.

* cited by examiner

METHOD FOR MANUFACTURING GRAIN-ORIENTED ELECTRICAL STEEL SHEET

TECHNICAL FIELD

The present disclosure relates to a method for manufacturing a grain oriented electrical steel sheet having low iron loss suitable for iron core materials of transformers or the like.

BACKGROUND

Grain-oriented electrical steel sheets, which are soft magnetic materials, are mainly used as iron core materials for transformers, rotating machines, and the like. Therefore, they are required to have high magnetic flux density and low iron loss and magnetostriction as magnetic properties. To meet these requirements, it is important to highly accord secondary recrystallized grains of a steel sheet with {110}<001> orientation (Goss orientation), and reduce impurities in a product steel sheet.

However, since there are limits on controlling crystal grain orientations and reducing impurities, some techniques have been developed for introducing non-uniformity into a surface of a steel sheet by physical means to subdivide the width of a magnetic domain to reduce iron loss, i.e., magnetic domain refining techniques.

For example, JPS57-2252B (PTL 1) proposes a technique of irradiating a steel sheet as a finished product with a laser to introduce linear high-dislocation density regions into a surface layer of the steel sheet, thereby narrowing magnetic domain widths and reducing iron loss of the steel sheet. Although this technique is widely used due to its excellent manufacturability, there is an essential problem that the magnetic domain refining effect is lost due to stress relief annealing. Therefore, in order to maintain the iron loss reduction effect, the application is limited to transformers with stacked iron cores, which are not normally subjected to strain relief annealing.

Meanwhile, a method for mechanically forming grooves with a gear-shaped roller or the like (JPH03-69968A (PTL 2)) and a method for electrically or chemically forming grooves by etching or the like (JPS61-117218A (PTL 3)) have been developed. Since with these groove formation methods, the magnetic domain refining effect is not lost and low iron loss values are maintained even after heat treatment such as stress relief annealing, a steel sheet obtained by the methods can be used as iron core materials for almost all transformers, including a transformer with a wound iron core. However, the former (PTL 2) involves maintenance of a worn gear-shaped roller, and the latter (PTL 3) involves the application and removal of resist ink used for etching. Such many manufacturing issues increase costs.

In contrast, JPH09-49024A (PTL 4) proposes a technique in which a groove is formed on a final cold-rolled sheet using a laser beam or plasma flame to maintain the magnetic domain refining effect even after stress relief annealing. However, the technique has a problem that convex parts such as burrs are formed on the upper part of the groove wall at the same time as the laser beam or plasma flame is irradiated, resulting in a decrease in the stacking factor and a decrease in the insulation properties of the coating applied afterward, causing dielectric breakdown of a transformer, and thus it has not been put into practical use.

In addition, the methods of applying magnetic domain refining by groove formation tend to make the groove non-uniform, resulting in variations in the obtained iron loss values, and also decrease the magnetic flux density by up to 1% before and after groove formation because the actual steel sheet cross-sectional area is reduced at portions where grooves are formed.

CITATION LIST

Patent Literature

PTL 1: JPS57-2252B
PTL 2: JPH03-69968A
PTL 3: JPS61-117218A
PTL 4: JPH09-49024A

SUMMARY

Technical Problem

It could thus be helpful to provide a method for manufacturing a grain-oriented electrical steel sheet to reduce iron loss by controlling the magnetic domain structure, in which the iron loss reduction effect can be maintained even when stress relief annealing is applied, and the magnetic flux density does not decrease after the magnetic domain control treatment.

Solution to Problem

We have newly discovered that when the surface of a steel sheet after secondary recrystallization in which crystal grains are accumulated in the Goss orientation is irradiated with a laser beam in a linear manner in a direction intersecting the rolling direction of the steel sheet (e.g., orthogonal direction) to melt the irradiated area locally, a re-solidified structure can be formed that is different from the original Goss-oriented structure, and this re-solidified structure can produce a magnetic domain refining effect. We made further studies to confirm that a groove may be formed depending on the laser irradiation conditions, and the formation of groove is not essential for magnetic domain refining when using the re-solidified structure for magnetic domain refining, but rather causes the negative effect of a decrease in magnetic flux density due to the decrease in the cross-sectional area of the steel sheet caused by groove (recessed part). Further, when a groove is formed, steel substrate is pushed away and heaped up around the groove, creating so-called burrs, which is disadvantageous in terms of stacking factor and insulation resistance.

The above-mentioned re-solidified structure refers to a solidified structure that has a crystal orientation different from the original before laser irradiation by irradiating a steel sheet to melt the irradiated area once and then solidifying it again. Therefore, this structure is different from the conventional strain-introduced structure, in which a linear strain distribution is retained by rapid heating and quenching by laser irradiation without melting the structure and the original crystal orientation is maintained.

Based on the above findings, we made intensive studies on the laser beam irradiation conditions that efficiently make the steel substrate absorb the incident energy of the laser beam and melt it while suppressing spatter. As a result, we found that on the surface of a steel sheet, irradiating a laser beam with a ring-shaped intensity distribution in which the intensity in the periphery is lower than that in the center, for example, irradiating a strong laser beam in the center and a weak laser beam on the periphery in a ring shape, can form a molten area without causing roughness on the steel sheet surface, and thus can produce a magnetic domain refining effect without changing the magnetic flux density, thereby reducing iron loss. A combination of laser beams with different wavelengths is also acceptable as long as the energy intensity is different. In addition, it is found that green, UV, and blue lasers with shorter wavelengths are more efficiently absorbed into the steel sheet surface with less reflection than YAG disk laser and fiber laser with a wavelength around 1.0 μm, which are commonly used, thus easily forming a molten area and further effective in reducing steel sheet surface roughness.

In the present disclosure, there is substantially no roughness on the steel sheet surface after laser beam irradiation treatment, so the decrease in magnetic flux density due to the treatment is 0.2% or less. Since the re-solidified structure is not lost even after stress relief annealing is performed, the iron loss reduction effect of the magnetic domain refining treatment is maintained after stress relief annealing.

We thus provide the following.

(1) A method for manufacturing a grain-oriented electrical steel sheet, comprising, on a surface of the grain oriented electrical steel sheet, irradiating a laser beam with a ring-shaped intensity distribution in which the intensity in a periphery is lower than that in a center in a linear manner in a direction intersecting a rolling direction of the steel sheet.

(2) The method for manufacturing a grain-oriented electrical steel sheet according to (1), wherein the laser beam has a wavelength of 0.15 μm or more and 0.9 μm or less.

(3) The method for manufacturing a grain-oriented electrical steel sheet according to (1) or (2), wherein the grain-oriented electrical steel sheet has a tension coating over a forsterite film.

Advantageous Effect

According to the present disclosure, iron loss of a grain-oriented electrical steel sheet can be further reduced even after stress relief annealing, as compared with the prior art, by applying magnetic domain refining treatment by irradiating a surface of the grain oriented electrical steel sheet with laser beam under suitable conditions.

DETAILED DESCRIPTION

First, the history of how the present disclosure has been developed will be described.

From the viewpoint that the incident energy of the laser beam is efficiently absorbed into the steel substrate, a laser beam with a shorter wavelength has a higher energy and a lower reflectance on the steel sheet surface, so it is effective to use laser beam with a shorter wavelength than conventional laser beam. Meanwhile, the steel sheet as the target of laser irradiation after secondary recrystallization annealing that develops the mainly Goss-oriented crystal grains generally has a forsterite film on the surface, which is formed by the reaction of an annealing separator mainly composed of MgO with $SiO_2$-based silicate formed on the steel sheet surface before secondary recrystallization. We examined the properties of the forsterite film that are necessary for irradiating the steel substrate surface with a laser beam through the forsterite film to achieve efficient energy absorption on the steel substrate surface and to generate a molten area with little roughness near the surface of the steel substrate. Although forsterite itself is a transparent crystal, it actually appears white, suggesting that light is diffusely reflected within the forsterite film due to the presence of grain boundaries. This means that a thicker forsterite film more easily absorbs the energy of the laser beam. Therefore, to achieve better efficient energy absorption into the steel substrate, a thinner forsterite film is better. Specifically, it is preferable to set the coating amount of the forsterite film to 3.2 $g/m^2$ or less. This is because when the forsterite film is thicker than 3.2 $g/m^2$, the laser beam energy required is higher, which may result in larger surface roughness during forming the re-solidified structure.

There are a wide variety of methods to reduce the thickness of the forsterite film, and any of them can be used. For example, since forsterite itself is a composite oxide of Si and Mg, $Mg_2SiO_4$, by lowering the dew point during decarburization annealing before secondary recrystallization annealing to reduce the amount of $SiO_2$-based surface oxides, lowering the hydration amount of an annealing separator mainly composed of MgO to reduce reactivity, reducing the amount of annealing separator applied itself, or devising the additive of annealing separator is devised, the coating amount of the forsterite film can be adjusted to 3.2 $g/m^2$ or less.

In addition, there are known techniques to reduce iron loss by smoothing the surface so as to intentionally prevent or suppress the formation of surface oxides such as forsterite film. For example, a technique to form a very thin external $SiO_2$, CVD, or PVD film as a substitute for the forsterite film is an example. If the formation of such a film can ensure bend adhesion properties and tension imparting effect, the coating amount of forsterite film can be greatly reduced, which is more desirable from the perspective of the efficiency of laser light energy absorption into the steel substrate of this disclosure.

Techniques to suppress the formation of forsterite film itself include lowering the dew point during decarburization annealing to suppress internal oxidation and form a very thin external $SiO_2$ layer, adding chlorides or the like as additives of the annealing separator or changing the main component of the annealing separator to $Al_2O_3$ or CaO to prevent the formation reaction of a forsterite film.

Next, suitable laser beam irradiation conditions will be described. Two types of magnetic domain refining techniques using laser beams are known: the so-called strain introduction type, in which the magnetic domain width is narrowed by applying thermal strain to the steel sheet surface to form a region with extremely high dislocation density; and the groove introduction type, in which a groove is formed directly on the steel substrate surface by high-energy laser beam irradiation, etc. to generate magnetic poles on the groove sides and narrow the magnetic domain width.

The laser beam irradiation conditions of the present disclosure are intermediate between them. In other words, in the conditions, the laser beam is irradiated to locally melt the area near the steel substrate surface, and the re-solidified structure thus obtained has a different crystal orientation from the main Goss orientation of the secondary recrystallized grains, which creates a pseudo-grain boundary effect and makes it possible to narrow the magnetic domain width. However, if the irradiation energy of the laser beam is too large, the steel substrate on the steel sheet surface is evaporated or sputtered to form a groove. Even if any groove is not formed, when a recessed part is formed, a burr-like convex portion is formed around it, resulting in a decrease in the stacking factor and the local thinning of the insulating coating formed thereon, causing a decrease in insulation and corrosion resistance. Therefore, irradiation conditions that cause as little grooves or roughness as possible to form in the irradiated area of the laser beam are desirable.

In order to efficiently and locally melt the steel substrate without causing roughness in the area irradiated by the laser beam, it is effective to use laser beams with different intensities. Specifically, if the laser beams are irradiated concentrically, the intensity of the laser beam in the center can be made stronger and the intensity of the laser beam in the periphery weaker to thereby suppress the evaporation of the steel substrate and spread of sputtering and melt only the central portion efficiently. As a means of creating a difference in irradiation energy of the laser beam between the center and the periphery, in addition to changing the energy density of the laser beam, it is also effective to use laser beams with different wavelengths. For example, a high intensity laser beam may be irradiated in the center as the main beam, and around the center, a low intensity laser beam, which is focus-adjusted and spread out in a ring shape, may be generated simultaneously as a sub beam to obtain laser beam with a ring-shaped intensity distribution in which the intensity in the periphery is lower than that in the center. The wavelength of the sub-beam may be the same as or different from that of the main beam. As long as the desired intensity distribution can be obtained at the irradiated area, one type of laser beam of transverse mode such as a ring mode may be used singularly, or a combination of two or more different types of laser beams of transverse mode may be used. Although it is difficult to limit the energy range of the laser beams on the high and low energy side, it is preferable to select a combination of laser beams with an energy range such that a molten area is formed on the steel sheet (steel substrate) surface and the degree of the (steel substrate) surface roughness is less than 3 μm.

As for the wavelength of the laser beam, as the wavelength is shorter, the laser beam has a higher energy and less reflects on the material surface and is better absorbed into the material. Specifically, the use of a laser beam with a wavelength of 0.9 μm or less lowers the reflectivity and increases the absorption rate, making it easier to form a local molten area while suppressing spatter. Use of a laser beam with a shorter wavelength is even more effective, when the laser beam irradiation technique according to the present disclosure is applied to the steel sheet in which forsterite film formation was suppressed or mirror-finish treatment was performed. The lower limit of wavelength of laser beam is preferably 0.15 μm in view of restrictions on manufacturing facilities.

For example, comparing with a YAG laser with a wavelength of 1.03 μm to 1.07 μm, which is widely used because it is easily focused, a green laser, the second harmonic of which has a wavelength of 0.53 μm half of that of a YAG laser, or a UV laser, the third and fourth harmonics of which have wavelengths of 0.36 μm and 0.27 μm, respectively, are advantageous in terms of maintaining surface flatness because they have good absorption efficiency and are less likely to produce spatter. Similarly, a blue laser with a wavelength of 0.44 μm to 0.49 μm using blue semiconductors, etc., and an excimer laser with a wavelength of 0.19 μm to 0.31 μm using halogen gas are also effective.

On the other hand, with a general laser beam with a wavelength of around 1 μm, it is very difficult to make the steel substrate (inside the steel sheet) absorb energy to form a local molten area because the laser beam is reflected when the steel sheet surface is, for example, mirror-like.

It is difficult to specify suitable conditions for the output of the laser beam because it is a combination of two or more laser beams of different intensities, but in terms of a total heat quantity per unit length, the output is preferably about 2 J/m or more. The output is preferably about 50 J/m or less. The laser beam spot diameter is preferably 100 μm or less. The spot diameter is defined as the longest major axis length of the irradiation shape formed by the high intensity laser beam in the center and the ring-shaped low intensity laser beam in the periphery.

Further, for the molten area formed by the laser beam near the steel sheet surface, the width is preferably 20 μm or more. The width is preferably 200 μm or less. The depth is preferably 2 μm or more. The depth is preferably 50 μm or less. The repetition interval in the rolling direction is preferably 0.5 mm or more. The repetition interval in the rolling direction is preferably 20 mm or less.

In the present disclosure, an expression of the laser beam being "linear" includes not only a solid line but also a dotted line or a broken line. Further, the "direction intersecting a rolling direction" stands for an angle range of within ±30° to the direction orthogonal to the rolling direction.

As the degree of preferred orientation of crystal grains after secondary recrystallization in <100> orientation as easy magnetization axis is higher, the magnetic domain refining effect is improved in the linear molten area by laser beams. Therefore, the higher $B_8$ value as an index of the degree of preferred orientation results in the higher iron-loss reduction effect by laser beam irradiation. Then, in the present disclosure, the steel sheet to be irradiated preferably has a magnetic flux density $B_8$ of 1.90 T or more. In addition, this disclosure relates to a magnetic domain refining technique that utilizes a molten re-solidified structure caused by laser irradiation from one side, and the effect is limited when the steel sheet is thick. Therefore, the target sheet thickness is preferably 0.23 mm or less.

Preferred manufacturing conditions of the present disclosure will be described hereinafter.

First, the preferred chemical composition of the material of the grain oriented electrical steel sheet will be described. The preferred chemical composition of the material may be appropriately selected such that secondary recrystallization occurs and B8 of at least 1.90 T is preferably obtained, based on various conventionally known chemical compositions of grain oriented electrical steel sheets. The chemical composition specifically described below is a mere example and others are acceptable.

When an inhibitor is used in the manufacture of the grain-oriented electrical steel sheet of the present disclosure, the chemical composition may contain appropriate amounts of Al and N in the case that an AlN-based inhibitor is utilized or appropriate amounts of Mn and Se and/or S in the case that a MnS·MnSe-based inhibitor is utilized. Both inhibitors may be used together. In this case, the Al content is preferably 0.01 mass % or more. The Al content is preferably 0.065 mass % or less. The N content is preferably 0.005 mass % or more. The N content is preferably 0.012 mass % or less. The S content is preferably 0.005 mass % or more. The S content is preferably 0.03 mass % or less. The Se content is preferably 0.005 mass % or more. The Se content is preferably 0.03 mass % or less.

The present disclosure is also applicable to a grain-oriented electrical steel sheet that has limited contents of Al, N, S and Se and is manufactured without using an inhibitor. In this case, the contents of Al, N, S and Se are preferably limited to Al: 100 mass ppm or less, N: 50 mass ppm or less, S: 50 mass ppm or less, and Se: 50 mass ppm or less, respectively.

Other basic components and optionally added components are as follows.

C: 0.08 Mass % or Less

The C content exceeding 0.08 mass % increases burden during the manufacturing process for reducing carbon content to 50 mass ppm or less at which magnetic aging does not occur. Therefore, the C content is preferably 0.08 mass % or less. The lower limit, which is not particularly set because a material not containing C can be secondary recrystallized, may be 0 mass %.

Si: 2.0 Mass % to 8.0 Mass %

Si is an element efficient for increasing electrical resistance of steel to improve iron loss. A Si content of 2.0 mass % or more ensures a particularly good iron loss reduction effect. Meanwhile, a Si content of 8.0 mass % or less ensures particularly excellent workability and magnetic flux density. Accordingly, the Si content is preferably 2.0 mass % or more. The Si content is preferably 8.0 mass % or less.

Mn: 0.005 Mass % to 1.0 Mass %

Mn is an element that is advantageous for improving hot workability. However, a Mn content of less than 0.005 mass % has a less addition effect. Meanwhile, a Mn content of 1.0 mass % or less ensures particularly good magnetic flux density of a product sheet. Accordingly, the Mn content is preferably 0.005 mass % or more. The Mn content is preferably 1.0 mass % or less.

In addition to the above basic components, the following elements may be appropriately contained as components for improving the magnetic properties: at least one selected from Ni: 0.03 mass % to 1.50 mass %, Sn: 0.01 mass % to 1.50 mass %, Sb: 0.005 mass % to 1.50 mass %, Cu: 0.03 mass % to 3.0 mass %, P: 0.02 mass % to 0.50 mass %, Mo: 0.005 mass % to 0.10 mass %, and Cr: 0.03 mass % to 1.50 mass %.

Ni is a useful element for further improving the microstructure of a hot rolled steel sheet and thus the magnetic properties. However, when a Ni content is less than 0.03 mass %, the magnetic properties-improving effect is small. Meanwhile, a Ni content of 1.50 mass % or less particularly increases stability in secondary recrystallization to improve magnetic properties. Thus, the Ni content is preferably 0.03 mass % or more. The Ni content is preferably 1.50 mass % or less.

Sn, Sb, Cu, P, Cr, and Mo are each an element useful for improving magnetic properties. If the contents of these components are less than the corresponding lower limits described above, respectively, the magnetic properties-improving effect is small. Meanwhile, contents of these elements equal to or lower than the corresponding upper limits described above, respectively ensure the optimum growth of secondary recrystallized grains. Therefore, the content of each of the components is preferably in the above-described range.

The balance other than the components described above is Fe and inevitable impurities mixed during the manufacturing process.

The conventionally known manufacturing process of a grain oriented electrical steel sheet can be basically applied to the manufacturing process of the grain oriented electrical steel sheet of the present disclosure.

A steel material adjusted to the above preferable chemical composition may be formed into a slab by normal ingot casting or continuous casting, or a thin slab or thinner cast steel with a thickness of 100 mm or less may be manufactured by direct continuous casting. The slab is subjected to heating and subsequent hot rolling in a conventional manner. The slab may be subjected to hot rolling directly after casting without heating. The thin slab or thinner cast steel may be either hot rolled or directly fed to the next process skipping hot rolling. Under preferable conditions, hot-rolled sheet annealing is performed as necessary, and then either one cold rolling operation or at least two cold rolling operations with intermediate annealing therebetween are performed so as to have the final sheet thickness. Then, decarburization annealing, application of an annealing separator mainly composed of MgO, final annealing, and optional provision of tension coating are performed in order to obtain a finished product.

Applicable examples of the tension coating include publicly-known tension coating such as glass coating mainly composed of phosphates like magnesium phosphate or aluminum phosphate and low-thermal expansion oxides like colloidal silica.

Any of various measures to adjust the film thickness described above are to be taken in the present disclosure so that the coating amount of forsterite film formed on a surface of the steel sheet during the final annealing is preferably 3.2 $g/m^2$ or less. In order to actively suppress the formation of forsterite film, measures may be used such as lowering the dew point during decarburization annealing or using non-decarburizing atmosphere to suppress the formation of $SiO_2$-based surface oxides, adding chlorides or the like as additives of the annealing separator, or changing the main component itself of the annealing separator to $Al_2O_3$ or CaO to prevent the formation reaction of a forsterite film.

EXAMPLES

A steel slab having the chemical composition consisting of C: 0.055 mass % (550 mass ppm), Si: 3.40 mass %, Mn: 0.30 mass %, Al: 0.017 mass % (170 mass ppm), S: 0.0015 mass % (15 mass ppm), Se: 0.010 mass % (100 mass ppm), N: 0.006 mass % (60 mass ppm), P: 0.06 mass %, Sb: 0.07 mass %, and Mo: 0.015 mass %, with the balance being Fe and inevitable impurities was heated to 1350° C., hot rolled to obtain a hot-rolled sheet with a thickness of 2.2 mm, subjected to hot-rolled sheet annealing for 30 seconds at 1050° C., and then cold rolled once in a tandem mill to obtain a cold-rolled sheet with a final sheet thickness of 0.23 mm. It was then heated to 820° C. and subjected to decarburization annealing for 1 minute and 10 seconds in a humid hydrogen atmosphere. Next, a magnesia-based annealing separator was applied to the steel sheet after decarburization annealing. As the annealing separator, those containing MgO as the main ingredient and $TiO_2$ with changed additive amount as additive were used. For some materials, Sb chloride was added to the annealing separator to suppress (reduce) the formation of forsterite film. Then, final annealing intended for secondary recrystallization, forsterite film formation, and purification was performed at 1200° C.

After measuring the magnetic properties (iron loss $W_{17/50}$) of the steel sheets thus obtained, a continuous oscillation fiber laser beam was irradiated in the center of each steel sheet as the main beam and around the center, simultaneously generated was a ring-shaped sub beam of the same wavelength, which was focus-adjusted and spread out, so that the main beam for the center and the ring-shaped sub beam for the peripheral with different intensity distributions were irradiated. Specifically, the scanning rate of the laser beams was set to 1000 mm/s, and the laser beams were irradiated in a linear manner in a direction perpendicular to the rolling direction at an irradiation interval of 5 mm in the steel sheet rolling direction. In doing so, the outputs of the main beam and the peripheral sub beam were varied in various ways. Further, the materials after laser beam irradiation were subjected to tension coating treatment including coating and baking of insulating coating consisting of 50% colloidal silica and magnesium phosphate. For some conditions, laser light irradiation treatment was performed after tension coating.

For the steel sheet samples thus obtained, Table 1 shows the results of the investigation of the coating amount of forsterite film, the degree of roughness measured by cross-sectional observation of the flatness near the area irradiated with the laser beam, and the magnetic properties (iron loss $W_{17/50}$), together with the laser beam irradiation conditions. The coating amount is the difference in mass before and after the forsterite film was removed with high temperature and high concentration of NaOH solution. The degree of roughness is the difference between the highest and lowest points in the cross-section near the irradiated area, measured from the surface with a three-dimensional laser displacement meter. The magnetic properties were measured according to the Epstein test method. For the sub beam irradiation conditions in Table 1, "irradiating periphery weakly" refers to the desired intensity distribution in which the intensity of the ring-shaped peripheral sub beam was lower than that of the central main beam. Meanwhile, "not irradiated" refers to the case in which the ring-shaped peripheral sub beam was not irradiated, and "irradiating periphery strongly" refers to the case in which the intensity of the ring-shaped peripheral sub beam was higher than that of the central main beam. The width of the molten area was measured with a three-dimensional laser displacement meter.

The width of the molten area can usually be measured with a three-dimensional laser displacement meter, but if it is difficult to determine, it may be determined by measuring the elastic strain quantity in the cross-section near the irradiated area using the Electron Back Scattering Diffraction pattern (EBSD) method and comparing or may be determined from the discontinuous portion in the magnetic domain structure using a magnet viewer.

TABLE 1

| Sample No. | Film Coating amount ($g/m^2$) | Laser Beam Irradiation Conditions: Main beam (wavelength) | Laser Beam Irradiation Conditions: Sub beam (Irradiation conditions) | Molten width | Material Coating | Magnetic Properties $W_{17/50}$(W/kg) Before treatment | Magnetic Properties $W_{17/50}$(W/kg) After treatment | After Irradiation Surface characteristics Surface roughness | Remarks |
|---|---|---|---|---|---|---|---|---|---|
| 1 | 3.0 | 1.07 μm | not irradiated | 50 μm | absent | 0.84 | 0.73 | large burr, 10 μm | Comparative Example |
| 2 | 2.8 | 1.07 μm | irradiating periphery weakly | 40 μm | present | 0.80 | 0.69 | almost flat, less than 3 μm | Example |
| 3 | 3.5 | 1.07 μm | irradiating periphery weakly | 30 μm | present | 0.78 | 0.71 | almost flat, less than 3 μm | Example |
| 4 | 2.9 | 1.07 μm | irradiating periphery strongly | 50 μm | absent | 0.85 | 0.72 | medium burr, 7 μm | Comparative Example |
| 5 | 0.9 | 1.07 μm | irradiating periphery weakly | 30 μm | absent | 0.85 | 0.66 | almost flat, less than 3 μm | Example |
| 6 | 2.7 | 0.53 μm | not irradiated | 35 μm | absent | 0.84 | 0.74 | large burr, 8 μm | Comparative Example |
| 7 | 3.0 | 0.53 μm | irradiating periphery weakly | 25 μm | present | 0.79 | 0.68 | almost flat, less than 3 μm | Example |
| 8 | 3.4 | 0.53 μm | irradiating periphery strongly | 30 μm | present | 0.77 | 0.71 | medium burr, 6 μm | Comparative Example |
| 9 | 2.9 | 0.53 μm | irradiating periphery weakly | 30 μm | absent | 0.85 | 0.68 | almost flat, less than 3 μm | Example |
| 10 | 0.9 | 0.53 μm | irradiating periphery weakly | 20 μm | absent | 0.84 | 0.67 | almost flat, less than 3 μm | Example |
| 11 | 2.8 | 0.45 μm | not irradiated | 30 μm | absent | 0.84 | 0.71 | small burr, 5 μm | Comparative Example |
| 12 | 3.0 | 0.45 μm | irradiating periphery weakly | 25 μm | present | 0.80 | 0.67 | almost flat, less than 3 μm | Example |
| 13 | 3.4 | 0.45 μm | irradiating periphery weakly | 20 μm | present | 0.78 | 0.72 | almost flat, less than 3 μm | Example |
| 14 | 2.7 | 0.45 μm | irradiating periphery strongly | 40 μm | absent | 0.78 | 0.73 | small burr, 4 μm | Comparative Example |

As seen from Table 1, when an electrical steel sheet having a forsterite film with coating amount of 3.2 $g/m^2$ or less is irradiated with an appropriate combination of laser beams of different energy densities (Examples), extremely low iron loss values and a flat surface without burrs near the irradiated area can be obtained.

It can also be seen that when a material which surface was made smooth by suppressing forsterite film formation, such as No. 5 and No. 10 is used, the iron loss is significantly improved (reduced) by using the present disclosure. Furthermore, it can be seen that as the wavelength of the laser beam is shortened, the burr height (amount of roughness) generated tends to become smaller.

The invention claimed is:

1. A method for manufacturing a grain-oriented electrical steel sheet, comprising, on a surface of the grain oriented electrical steel sheet, irradiating using a laser beam with a ring-shaped intensity distribution comprising a relatively lower intensity in a periphery and a relatively higher intensity in a center, wherein the irradiating is in a linear manner in a direction intersecting a rolling direction of the steel sheet.

2. The method for manufacturing a grain-oriented electrical steel sheet according to claim 1, wherein the laser beam has a wavelength of 0.15 μm or more and 0.9 μm or less.

3. The method for manufacturing a grain-oriented electrical steel sheet according to claim 2, wherein the irradiating causes melting of at least a portion of the surface irradiated by the relatively higher intensity.

4. The method for manufacturing a grain-oriented electrical steel sheet according to claim 3, wherein the melting forms a re-solidified structure different from a Goss-oriented structure.

5. The method for manufacturing a grain-oriented electrical steel sheet according to claim 1, wherein the grain-oriented electrical steel sheet has a tension coating over a forsterite film.

6. The method for manufacturing a grain-oriented electrical steel sheet according to claim 2, wherein the grain-oriented electrical steel sheet has a tension coating over a forsterite film.

7. The method for manufacturing a grain-oriented electrical steel sheet according to claim 6, wherein the irradiating causes melting of at least a portion of the surface irradiated by the relatively higher intensity.

8. The method for manufacturing a grain-oriented electrical steel sheet according to claim 7, wherein the melting forms a re-solidified structure different from a Goss-oriented structure.

9. The method for manufacturing a grain-oriented electrical steel sheet according to claim 5, wherein the irradiating causes melting of at least a portion of the surface irradiated by the relatively higher intensity.

10. The method for manufacturing a grain-oriented electrical steel sheet according to claim 9, wherein the melting forms a re-solidified structure different from a Goss-oriented structure.

11. The method for manufacturing a grain-oriented electrical steel sheet according to claim 1, wherein the irradiating causes melting of at least a portion of the surface irradiated by the relatively higher intensity.

12. The method for manufacturing a grain-oriented electrical steel sheet according to claim 11, wherein the melting forms a re-solidified structure having a different crystal orientation from a Goss-oriented structure.

* * * * *